United States Patent Office 2,734,813
Patented Feb. 14, 1956

2,734,813

ABRASIVE ARTICLE

Charles A. Zalud, Chicago, Ill., assignor to Titan Abrasives Company, a corporation of Illinois No Drawing. Application November 19, 1953, Serial No. 393,215

7 Claims. (Cl. 51—298)

This invention relates to an abrasive article.

This application is a continuation-in-part of my copending application Serial No. 206,713, filed January 18, 1951, now abandoned.

Abrasive articles of the type used in dry snagging have long been made containing grains of an abrasive material and a relatively small amount of a bond intimately associated with the grains and serving as a binder. In industrial applications the abrasive article is ordinarily in the form of a disc where the grinding is accomplished on the side of the article or a wheel where the grinding is accomplished on the periphery. In these abrasive articles it has long been proposed to use a filler such a scryolite compounded with a resinoid material such as a thermoset resin as the bond. This filler reduces the amount of resin required in the abrasive article and in general increases the efficiency of the abrasive article. These prior articles have in general used a bond including a relatively low ratio of filler with respect to the binder of the bond.

When using abrasive articles, particularly discs or wheels of the snagging type running at high speeds where relatively high temperatures are developed, it has long been a problem to prevent glazing over of the surface of the article. This glazing over is apparently caused by the heat of friction softening the resin of the bond so that it flows over the surface and covers and hides the grains of abrasive material. Attempts have been made to solve this problem by directing cooling air over the surface that is being used. However, this in itself creates problems of considerable magnitude because of the limited space available in most commercial grinding installations.

Applicant has successfully solved these problems and provided a superior abrasive article that is cooler operating and much more efficient in its operation by using a small amount of a bond containing a relatively great amount of filler in proportion to the resin. Although this resin is present as a continuous phase, the large amount of filler hardens the bond and makes it cooler running and more resistant to breaking down under heat. Furthermore, the increased filler results in an abrasive article that is extremely hard and also free cutting; that is, the article easily and quickly removes metal. This harder article has a greater life so that costs are considerably reduced. Furthermore, more bond can be used without danger of the article glazing over when operated at high temperatures.

The new abrasive articles are also easier to cure in that less resin is required in the bond. The moisture problem is also lessened to the degree where no lime or other compounds for taking up moisture are required. One extremely important advantage of this invention is the fact that the amount of resin, which is the poorest cutting element present in the abrasive article, is considerably reduced. The addition of filler increases the flexural strength of the bond. This lessens the amount of resin required to attain any desired hardness.

A very important advantage is that the new article is freer cutting with the result that more material is ground per hour. At the same time, the new article has a much greater effective life. In the past, manufacturers have had to be satisfied with one or the other of these advantages but were unable to obtain both. The new articles of this invention, however, attain both advantages in a single article.

Another important advantage is that the abrasive articles such as wheels and discs are more versatile giving a greater latitude of uses so that not so many different kinds of abrasive articles are required with each being especially tailored to a particular job.

The abrasive articles of this invention are particularly useful for dry snagging. They may be used to great advantage for grinding flat surfaces on castings, steel parts and the like where excessive heat is a factor as these articles do not overheat and do not distort during grinding.

In the articles of this invention the amount of resin may be varied between 7 and 14 parts by weight of resin to each 160 parts by weight of abrasive grains. With this resin a filler is used so that the combination of the resin and filler comprises the bond. The amount of filler in the bond varies from a minimum of about 67–72% by weight of the bond to a maximum of about 95% by weight of the bond. The minimum amount will vary depending upon the amount of resin used in the article. Thus, when 7 parts of resin are used to 160 parts of abrasive grains the minimum amount of filler is preferably 70–72% by weight of the bond. Similarly, when 8 parts of resin are used the minimum amount of filler is about 70%. When 9 parts of resin are used the minimum amount of filler is about 69%. When the amount of resin is between 10 and 14 parts inclusive to this 160 parts of abrasive grains, the minimum amount of filler in the bond is preferably about 67% by weight of the bond.

The abrasive material that may be used is the customary abrasive grains and may include aluminum oxide, silicon carbide, boron carbide, corundum, garnet, emery and any of the other customary abrasive materials, or mixtures thereof. These may be employed in the standard grinding grades. The grit size is of the usual grades as graded by the United States Bureau of Standards. These abrasive materials and their uses for particular jobs are well understood by those skilled in the art and are not changed in the abrasive articles of this invention.

The thermoset resin binders that may be used in this invention are those customarily employed in the art. The preferred resin is a thermoset resin and preferably a thermoset aldehyde condensation product resin. Such resins are the phenolic compound-aldehyde resins and amine-aldehyde resins and particularly those made with primary amines and especially the primary aromatic amines. Excellent examples of such condensation products are the phenol-formaldehyde resins and the aromatic amine-aldehyde resins, particularly those produced from primary amines such as aniline. These resins and their uses are standard to the abrasive industry. One such dry resin that has found wide use is a phenol-formaldehyde resin known as "Bakelite BR–2417." A liquid resin is one known as "Bakelite BR–7534."

The inorganic fillers that may be used are also standard and well known to the abrasive industry. These are provided in finely divided form such as those ground so that 99% will pass through a 200 mesh screen and include cryolite, fluorospar, magnesium oxide, silica and the like. Both the filler and the solid resin binder are preferably ground quite fine.

As has been pointed out above, a dehydrating agent is not required when preparing an abrasive article according to this invention. However, such an agent may be used if desired. When used it is ordinarily considered a part of the filler. In general, any added compounding ingredient is considered a part of the abrasive, the binder or the filler governed by its action in the abrasive article. Thus, if the particular compounding ingredient has the action of an abrasive, it is considered as a part of the abrasive ingredient. Likewise, if the added material has the action of a filler or of a binder, it is considered according to its nature as a part of either of those ingredients.

As the ingredients of the abrasive article must be thoroughly mixed before being molded and heated to set the resin, it is customary to use an ingredient having wetting action in order to insure uniform distribution of the bond. A liquid type resin is an example of such an ingredient and may be used in making the abrasive articles of this invention. The liquid is added in the usual manner and in the usual amount. Furfural, furfural alcohol, acetone, or any of several materials are well known as capable of wetting the abrasive grains and are used for this purpose.

As has been pointed out above, the important factor of this invention is in using a relatively small amount of resin and increasing the amount of inorganic filler above that formerly considered to be a maximum. The various ingredients of the abrasive articles and their uses and the steps followed in preparing the abrasive article of this invention are all well known to those skilled in the art as they are standard materials and procedures for this art.

In one example of making an abrasive disc according to this invention, 800 parts of fused aluminum oxide grains were mixed with 20 parts of Bakelite BR-7534 liquid resin. 150 parts of finely divided cryolite and 30 parts of Bakelite BR-2417 were added. All parts are by weight. Both the dry resin and the cryolite filler were ground so that 99% passed through a 200 mesh screen. The ingredients were thoroughly mixed to achieve substantially uniform distribution. The mixture was cold molded into the shape of a self-supporting disc and this disc heated to cure the resin. The initial temperature was about 180° F. and this temperature was slowly raised to about 360° F. over a forty hour period. Such baking temperatures and times are customary in the abrasive article art. At the end of this time the abrasive disc was removed from the oven and was found to be a relatively hard, fast cutting and cool cutting abrasive disc having the important advantages set out above.

The uncured or "green" mixture of abrasive grains, binder, fillers and any of the other customary ingredients can be molded cold and then cured by heating, as explained in the example above, or can be molded and cured in a heated press. During the curing operation the temperature may be raised to any amount so long as it is not high enough to break down the resin. Ordinarily the maximum temperature is less than 400° F. The curing time is ordinarily from 40 to 120 hours although this will depend upon the type and amount of resin employed as well as other factors, as is well known. In the same manner the maximum temperature will also depend upon the type of resin used and an excellent resin has been found to be a phenol-formaldehyde condensation product such as those set out in the above example.

While I have described certain embodiments of my invention, it is to be understood that it is capable of many modifications. Changes, therefore, in the materials and other factors may be made without departing from the spirit and scope of the invention as disclosed in the appended claims.

I claim:

1. An abrasive article including about 160 parts by weight of grains of an abrasive material and a bond intimately associated with said grains, said bond consisting essentially of about 7 to 14 parts by weight of a thermoset resin binder and from a minimum of about 67% to a maximum of about 95%, all by weight of said bond, of an insoluble mineral filler, said filler being in addition to said abrasive material.

2. An abrasive article including about 160 parts by weight of grains of an abrasive material and a bond intimately associated with said grains, said bond consisting essentially of about 7 to 14 parts by weight of a thermoset resin binder and from a minimum of about 67% to a maximum of about 90%, all by weight of said bond, of an insoluble mineral filler, said filler being in addition to said abrasion material.

3. An abrasive article including about 160 parts by weight of grains of an abrasive material and a bond intimately associated with said grains, said bond consisting essentially of about 7 to 14 parts by weight of a thermoset aldehyde condensation product resin binder and from a minimum of about 67% to a maximum of about 95%, all by weight of said bond, of an insoluble mineral filler, said filler being in addition to said abrasive material.

4. An abrasive article including about 160 parts by weight of grains of an abrasive material and a bond intimately associated with said grains, said bond consisting essentially of about 7 to 14 parts by weight of a thermoset aldehyde condensation product resin binder and from a minimum of about 67% to a maximum of about 90%, all by weight of said bond, of an insoluble mineral filler, said filler being in addition to said abrasive material.

5. An abrasive article including about 160 parts by weight of grains of an abrasive material and a bond intimately associated with said grains, said bond consisting essentially of about 7 to 14 parts by weight of a thermoset phenolic resin binder and from a minimum of about 67% to a maximum of about 90%, all by weight of said bond, of an insoluble mineral filler, said filler being in addition to said abrasive material.

6. An abrasive article including about 160 parts by weight of grains of an abrasive material and a bond intimately associated with said grains, said bond consisting essentially of about 7 to 14 parts by weight of a thermoset amino-aldehyde condensation product resin binder and from a minimum of about 67% to a maximum of about 90%, all by weight of said bond, of an insoluble mineral filler, said filler being in addition to said abrasive material.

7. An abrasive article includnig about 160 parts by weight of grains of an abrasive material and a bond intimately associated with said grains, said bond consisting essentially of about 10 parts by weight of a thermoset resin binder and about 75% all by weight of said bond, of an insoluble mineral filler, said filler being in addition to said abrasive material.

References Cited in the file of this patent

UNITED STATES PATENTS

| | | |
|---|---|---|
| 2,294,239 | Novotny et al. | Aug. 25, 1942 |
| 2,308,982 | Kistler | Jan. 19, 1943 |
| 2,552,485 | Howard et al. | May 8, 1951 |
| 2,580,708 | Wallace et al. | Jan. 1, 1952 |